(12) United States Patent
Advani et al.

(10) Patent No.: US 11,540,443 B2
(45) Date of Patent: Jan. 3, 2023

(54) SYSTEM AND METHOD FOR MEASUREMENT OF HARVESTED MATERIAL IN A CLEANING ASSEMBLY

(71) Applicant: Deere & Company, Moline, IL (US)

(72) Inventors: Gurmukh H. Advani, West Fargo, ND (US); Noel W. Anderson, Fargo, ND (US); Kartheek Karna, Fargo, ND (US)

(73) Assignee: Deere & Company, Moline, IL (US)

( * ) Notice: Subject to any disclaimer, the term of this patent is extended or adjusted under 35 U.S.C. 154(b) by 1009 days.

(21) Appl. No.: 16/263,922

(22) Filed: Jan. 31, 2019

(65) Prior Publication Data

US 2020/0245556 A1 Aug. 6, 2020

(51) Int. Cl.

| A01D 41/127 | (2006.01) |
|---|---|
| A01D 75/28 | (2006.01) |
| A01F 12/44 | (2006.01) |
| A01D 75/00 | (2006.01) |
| H04R 3/00 | (2006.01) |

(Continued)

(52) U.S. Cl.
CPC ..... *A01D 41/1271* (2013.01); *A01D 41/1276* (2013.01); *A01D 75/00* (2013.01); *A01F 12/448* (2013.01); *H04R 3/005* (2013.01); *H04R 5/027* (2013.01); *H04R 5/04* (2013.01); *A01D 75/282* (2013.01)

(58) Field of Classification Search
CPC .......... A01D 411/1271; A01D 41/1276; A01D 75/00; A01D 41/1271; A01D 75/282; A01F 12/448; A01F 12/446; A01F 12/32; A01F 12/34; A01F 12/44

See application file for complete search history.

(56) References Cited

U.S. PATENT DOCUMENTS

| 4,360,998 A | 11/1982 | Somes |
|---|---|---|
| 4,679,160 A | 7/1987 | Whitener |

(Continued)

FOREIGN PATENT DOCUMENTS

| EP | 0077667 A1 | 4/1983 | |
|---|---|---|---|
| EP | 2949199 A1 | 12/2015 | |
| EP | 1832863 B1 * | 6/2016 | ......... A01D 41/1273 |

OTHER PUBLICATIONS

European Search Report issued in counterpart application No. 19216699.9 dated Jun. 5, 2020 (05 pages).

(Continued)

*Primary Examiner* — Alicia Torres
*Assistant Examiner* — Madeline I Runco

(57) ABSTRACT

Receivers are arranged to detect a corresponding observed phase shift, observed attenuation or other observed signal parameters for its respective microphone. An electronic data processor is adapted to estimate a distribution or quantity of material on the sieve based on the observed phase shift, the observed attenuation or the other observed signal parameters relative to a reference phase shift, a reference attenuation or other reference signal parameter. The operator can be alerted via a user interface if the material on the sieve is unevenly distributed or matches a preestablished distribution profile, or the sieve can be adjusted by an actuator to promote a generally uniform distribution.

18 Claims, 8 Drawing Sheets

(51) Int. Cl.
*H04R 5/027* (2006.01)
*H04R 5/04* (2006.01)

(56) References Cited

U.S. PATENT DOCUMENTS

| | | | | |
|---|---|---|---|---|
| 6,114,971 | A * | 9/2000 | Nysen | G06K 7/10009 340/10.3 |
| 6,366,210 | B2 * | 4/2002 | Lemke | A01D 46/082 460/115 |
| 6,425,407 | B2 | 7/2002 | Jones et al. | |
| 6,489,784 | B2 * | 12/2002 | Adams | A01D 41/1277 324/663 |
| 6,773,343 | B2 | 8/2004 | Grywacheski et al. | |
| 6,791,488 | B2 * | 9/2004 | Diekhans | A01D 41/141 342/123 |
| 6,962,526 | B2 * | 11/2005 | Ho | A01D 41/127 460/1 |
| 7,415,365 | B2 * | 8/2008 | Jeppe | A01F 29/095 702/56 |
| 7,492,282 | B2 | 2/2009 | Danz et al. | |
| 7,584,663 | B2 * | 9/2009 | Missotten | G01N 15/1031 460/45 |
| 7,654,141 | B2 * | 2/2010 | Behnke | A01D 41/1273 73/584 |
| 7,846,013 | B1 * | 12/2010 | Diekhans | A01D 41/1276 460/1 |
| 8,394,002 | B2 | 3/2013 | Park | |
| 9,026,310 | B2 | 5/2015 | Tran et al. | |
| 9,345,197 | B2 | 5/2016 | Biggerstaff et al. | |
| 9,832,927 | B2 * | 12/2017 | Moutton | A01F 12/44 |
| 10,356,979 | B2 * | 7/2019 | Mahieu | A01F 7/06 |
| 10,470,365 | B2 * | 11/2019 | Mahieu | G01S 13/88 |
| 10,470,366 | B2 * | 11/2019 | Mahieu | A01D 41/1243 |
| 10,660,268 | B2 * | 5/2020 | Dybro | A01D 41/1272 |
| 10,721,865 | B2 * | 7/2020 | Duquesne | A01F 12/448 |
| 10,871,458 | B2 * | 12/2020 | Todd | G01N 22/00 |
| 2003/0165341 | A1 * | 9/2003 | Bulow | H04J 14/02 398/98 |
| 2005/0186997 | A1 | 8/2005 | Ho et al. | |
| 2014/0283491 | A1 * | 9/2014 | Singh | G01D 5/00 73/861.353 |
| 2016/0000008 | A1 | 1/2016 | Scholer et al. | |
| 2017/0248453 | A1 * | 8/2017 | Herlitzius | A01D 41/1272 |
| 2017/0311547 | A1 | 11/2017 | Fuchs et al. | |
| 2018/0098495 | A1 * | 4/2018 | Van Meurs | A01C 7/105 |
| 2020/0196531 | A1 * | 6/2020 | Hermann | A01D 41/1272 |
| 2021/0084818 | A1 * | 3/2021 | Poelling | A01D 41/1277 |
| 2022/0071088 | A1 * | 3/2022 | Hermann | A01F 12/28 |

OTHER PUBLICATIONS

Hikita, Munenori. "An Introduction to Ultrasonic Sensors for Vehicle Parking." New Electronics, vol. 12 [online], May 2010 [retrieved on Jan. 31, 2019], Retrieved from the Internet:< URL: http://www.newelectronics.co.uk/electronics-technology/an-introduction-to-ultrasonic-sensors-for-vehicle-parking/24966/>.

* cited by examiner

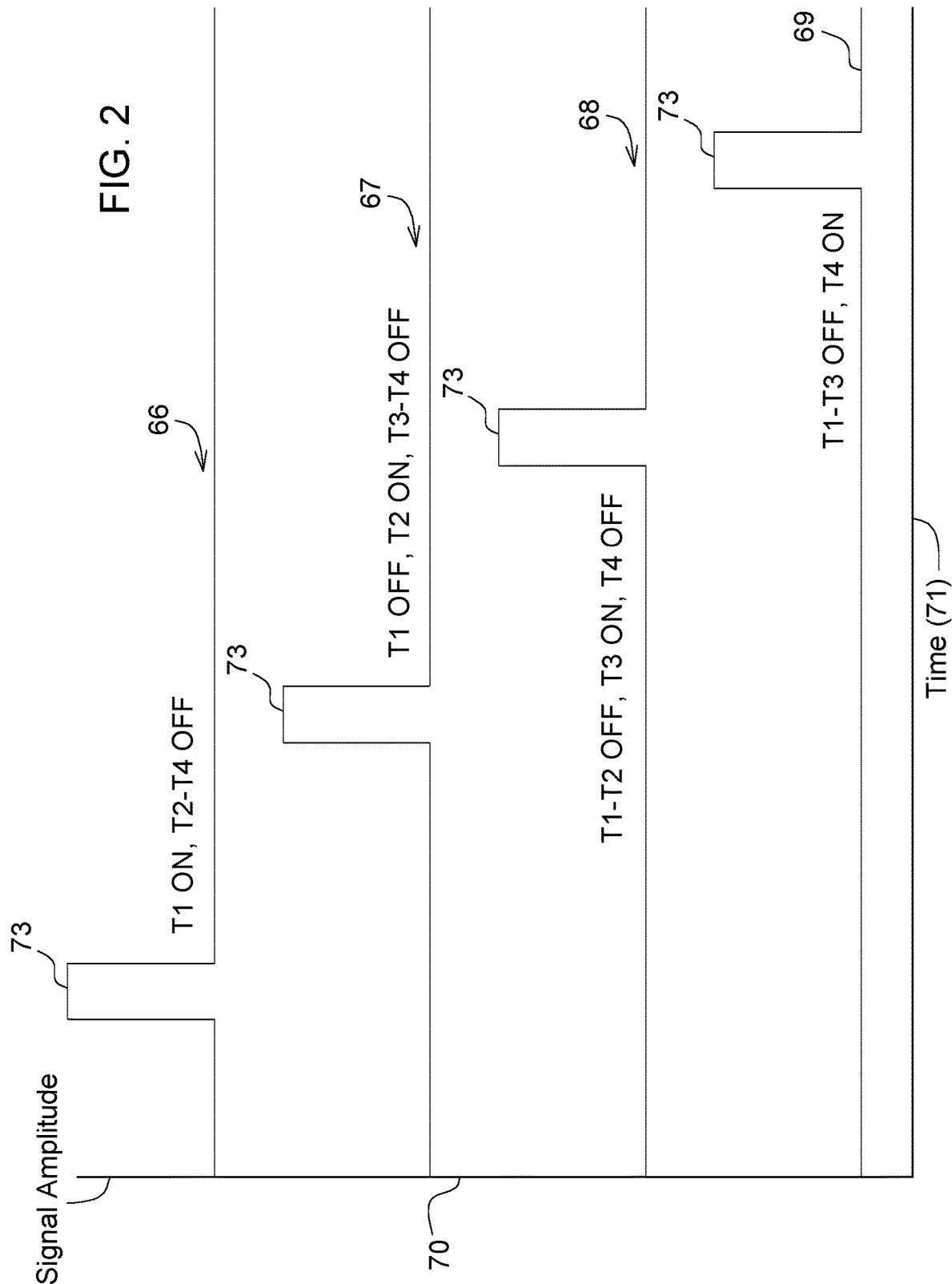

SYSTEM AND METHOD FOR MEASUREMENT OF HARVESTED MATERIAL IN A CLEANING ASSEMBLY

FIELD

This disclosure relates to a system and method for measurement of harvested material in a cleaning assembly of a combine or harvester.

BACKGROUND

In a combine or a harvester, a cleaning assembly facilitates separation of harvested material into grain and chaff or other crop residue. Improper clearance adjustment of the sieve may impact whether harvested material accumulates on the sieve of the cleaning assembly. For example, if the clearance is too small or operated in hilly terrain, harvested material may accumulate on the sieve without being readily recognized by an operator of the harvester or combine. In some prior art, the cleaning assembly is typically difficult to inspect during operation of harvester or combine and is concealed within the internal confines of the harvester or combine. Further, if harvested material is not uniformly or evenly distributed on the movable sieve of a cleaning assembly, at times the agitating or sliding movement of the sieve may not effectively separate the grain and chaff or other crop residue. The improperly adjusted clearance can result in excessive grain loss and uneven distribution of chaff and other crop residue in the field from the crop residue exit of the combine or harvester. Thus, there is need for a system for measurement of harvested material in a cleaning assembly to operate efficiently the combine or harvester to minimize any potential loss of crop yield and to uniformly distribute crop residue in the field.

SUMMARY

In accordance with one embodiment, a system for measurement of harvested agricultural material in a cleaning assembly of a combine or harvester comprises a sieve of the cleaning assembly for separating the harvested agricultural material into crop residue and target crop material. At least one transmitter is configured to generate or transmit an electromagnetic signal. A set of transducers can convert the electromagnetic signal into transmitted waves (e.g., extended sonic wavelength waves or extended sonic frequency waves) within a target wavelength range (e.g., comprising an ultrasonic wavelength range, a humanly audible wavelength range, or a subsonic wavelength range). A set of microphones is configured to convert the transmitted waves into a received electromagnetic signal. Each of the set of microphones is longitudinally spaced apart from each other along a longitudinal axis of the sieve for reception of the transmitted waves in a first mode (e.g., transmissive mode through the harvested agricultural material), or in a second mode (e.g., reflective mode reflected from the harvested agricultural material). A plurality of receivers is arranged to receive the received electromagnetic signals associated with respective ones of the microphones. Each of the plurality of receivers are arranged to detect a corresponding observed phase shift, observed attenuation or other observed signal parameters for its respective microphone (e.g., or respective set of microphones). An electronic data processor is adapted to estimate a distribution or quantity of material on the sieve (e.g., along the longitudinal axis) based on the observed phase shift, the observed attenuation or the other observed signal parameters relative to a reference phase shift, a reference attenuation or other reference signal parameter. The operator can be alerted via a user interface if the material on the sieve is unevenly distributed or matches a preestablished distribution profile, or the sieve can be adjusted by an actuator to promote a generally uniform distribution.

BRIEF DESCRIPTION OF THE DRAWINGS

FIG. 2 is a diagram of signal amplitude versus transmission times for each transmitter in the measurement system in accordance with a time-division multiplex configuration at a common frequency within the target wavelength range.

DETAILED DESCRIPTION

As used in this document, adapted, configured, or arranged can be regarded as synonymous terms. Adapted, configured or arranged mean that a device, processor, interface, module, or other element is structured, designed, or programmed with electronics hardware, software, or both to facilitate or achieve a functional result or outcome that is specified. For example, a data storage device may store software, data, libraries, or software instructions that can be executed or processed by an electronic data processor to achieve a certain functional result or identified outcome. Conventionally and as used in this document, wavelength and frequency are related to each other such that the wavelength (w) multiplied by the frequency (f) equals the propagation speed in the medium in which the signal is propagating, such as a propagation speed equal to the speed of light (C) in a vacuum (e.g., $w*f=C$).

Figure 1A:
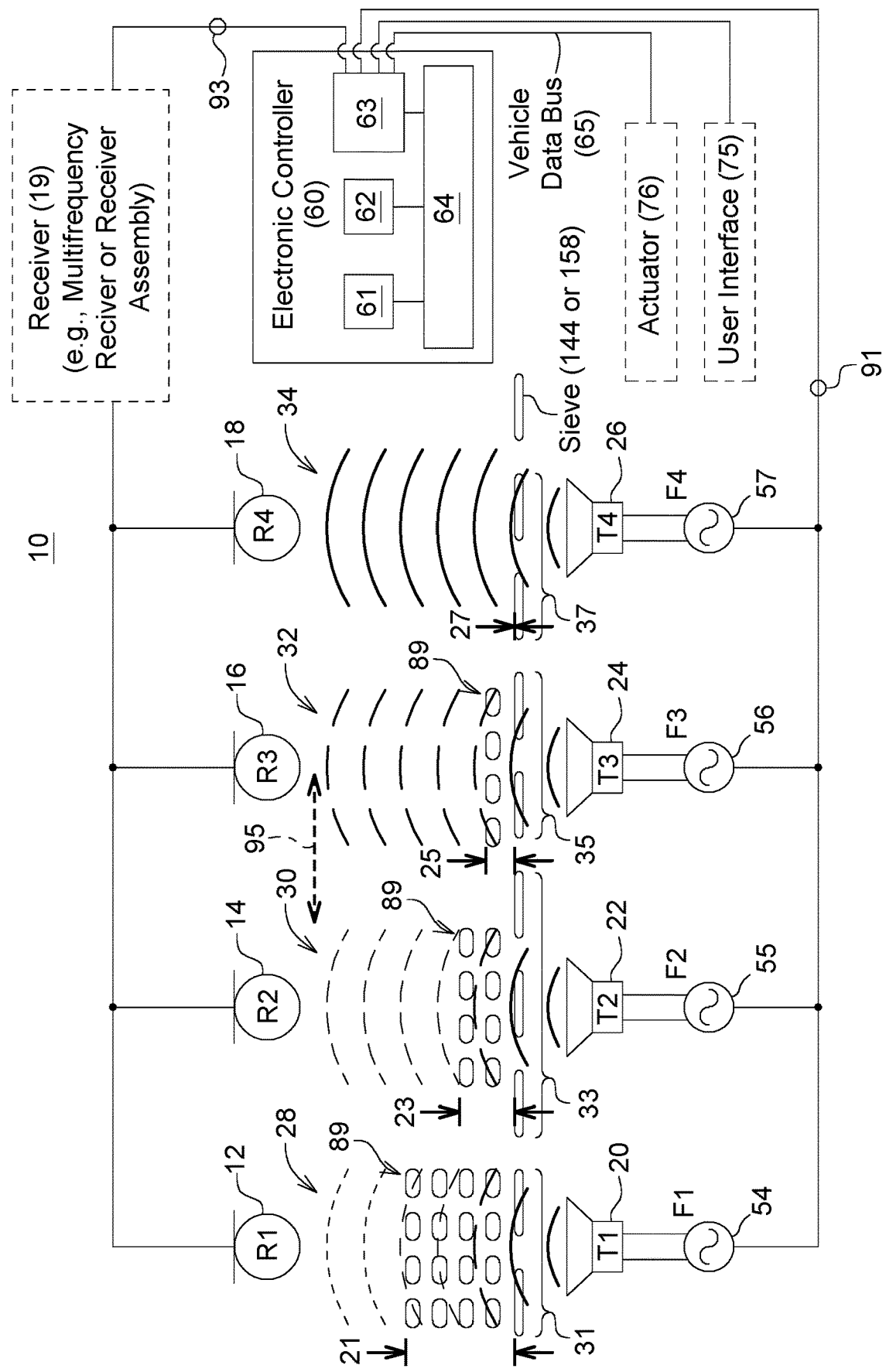
FIG. 1A is a block diagram of one embodiment of a system for measurement of harvested agricultural material associated with a sieve in a first mode (e.g., transmissive mode) at different frequencies or with different coding.

In accordance with one embodiment, FIG. 1A illustrates a system 10 for measurement of harvested agricultural material 89 in a cleaning assembly (e.g., 126 in FIG. 5) of a combine (e.g., 510 in FIG. 5) or harvester. The cleaning assembly 126 comprises one or more sieves (144, 158, or both in FIG. 5 and FIG. 6) for separating the harvested agricultural material 89 into crop residue and target crop material.

In the system 10, at least one transmitter (54, 55, 56, 57) is configured to generate or transmit an electromagnetic signal (e.g., simultaneously or at different times in response to a control data message or control signal from the electronic controller 60). As illustrated in FIG. 1A, the set of transmitters comprises a first transmitter 54, a second transmitter 55, a third transmitter 56, and a fourth transmitter 57, although any number of transmitters greater than or equal to two may be used.

In an alternate embodiment, a single transmitter (e.g., 54) may be used to generate or transmit an electromagnetic signal that one or more transmit transducers (20, 22, 24, 26) convert into transmitted waves for reception by one or more receive transducers (e.g., an array of spatially separated or distributed microphones, 12, 14, 16, 18) and one or more respective receivers (19, 119), where the one or more transmit transducers (20, 22, 24, 26) may have, mechanically or electrically, tiltable, focused or angled radiation patterns with one more main radiation lobes (e.g., dynamically during different time slots) directed toward one or more target receive transducers for operation in the first mode. Accordingly, any reference attenuation, reference phase shift, and other reference signal parameters for a corresponding amount, level or volume of harvested material 89 may require calibration because the signal or transmitted wave would travel at an angle though the harvested agricultural material 89. Hence, the transmitted wave would travel a potentially longer distance through the harvested agricultural material 89 between any transmit transducer (20, 22, 24, 26) associated with the single transmitter and one or more respective receive transducers, coupled to one or more respective receivers (19, 119), which could result increased baseline attenuation or increased phase shift for a uniform level of harvested material 89.

In another alternate embodiment, a single receiver (19, 119) may be used to receive electromagnetic signals from one or more receive transducers (e.g., an array of microphones, 12, 14, 16, 18) from a plurality of transmit transducers (20, 22, 24, 26) and associated respective transmitters (54,55, 56, 57), where the one or more receive transducers may have, mechanically or electrically, tiltable, focused or angled reception-radiation patterns with one or more radiation lobes directed (e.g., dynamically during different time slots) toward the transmit transducers (20, 22, 24, 26) for operation in the first mode. Accordingly, any reference attenuation, reference phase shift, and other reference signal parameters for a corresponding amount, level or volume of harvested material 89 may require calibration because the signal or transmitted wave would travel at an angle; hence increased distance, though the harvested agricultural material 89 between the transmitters (54,55, 56, 57), and a single respective receiver (19, 119), which could result increased baseline attenuation or phase shift for a uniform level of harvested material.

A set of transmit transducers (20, 22, 24, 26) can convert the transmitted electromagnetic signal into transmitted waves (e.g., acoustic waves) within a target wavelength range comprising one or more of the following: an extended sonic wavelength range, an ultrasonic wavelength range, a humanly audible wavelength range, or a subsonic wavelength range. As used in this document, an extended sonic wavelength range or frequency range shall refer to one or more of the following: an ultrasonic wavelength range, a humanly audible wavelength range, or a subsonic wavelength range.

In FIG. 1A, the system 10 may operate in a first mode (e.g., transmissive mode) in accordance with different frequencies (e.g., coded orthogonal frequency division multiplex signal) within the target wavelength range (or target frequency range), or at different times (e.g., in different time slots) to avoid interference between simultaneous transmissions of the transmitters (54, 55, 56, 57). For example, the first transmitter 54 in conjunction with the first transmit transducer 20 transmits a first transmitted wave 28 (illustrated as the shortest-length dashes within the dashed lines) at a first corresponding frequency; the second transmitter 55 in conjunction with the second transmit transducer 22 transmits a second transmitted wave 30 (illustrated as the medium length dashes within the dashed lines) at a second corresponding frequency; the third transmitter 56 in conjunction with the third transmit transducer 24 transmits a third transmitted wave 32 (illustrated as the longest-length dashes in the dashed lines) at a third frequency; the fourth transmitter 57 in conjunction with the fourth transmit transducer 26 transmits a fourth transmitted wave 34 (illustrated in solid lines) at a fourth frequency.

Figure 1B:
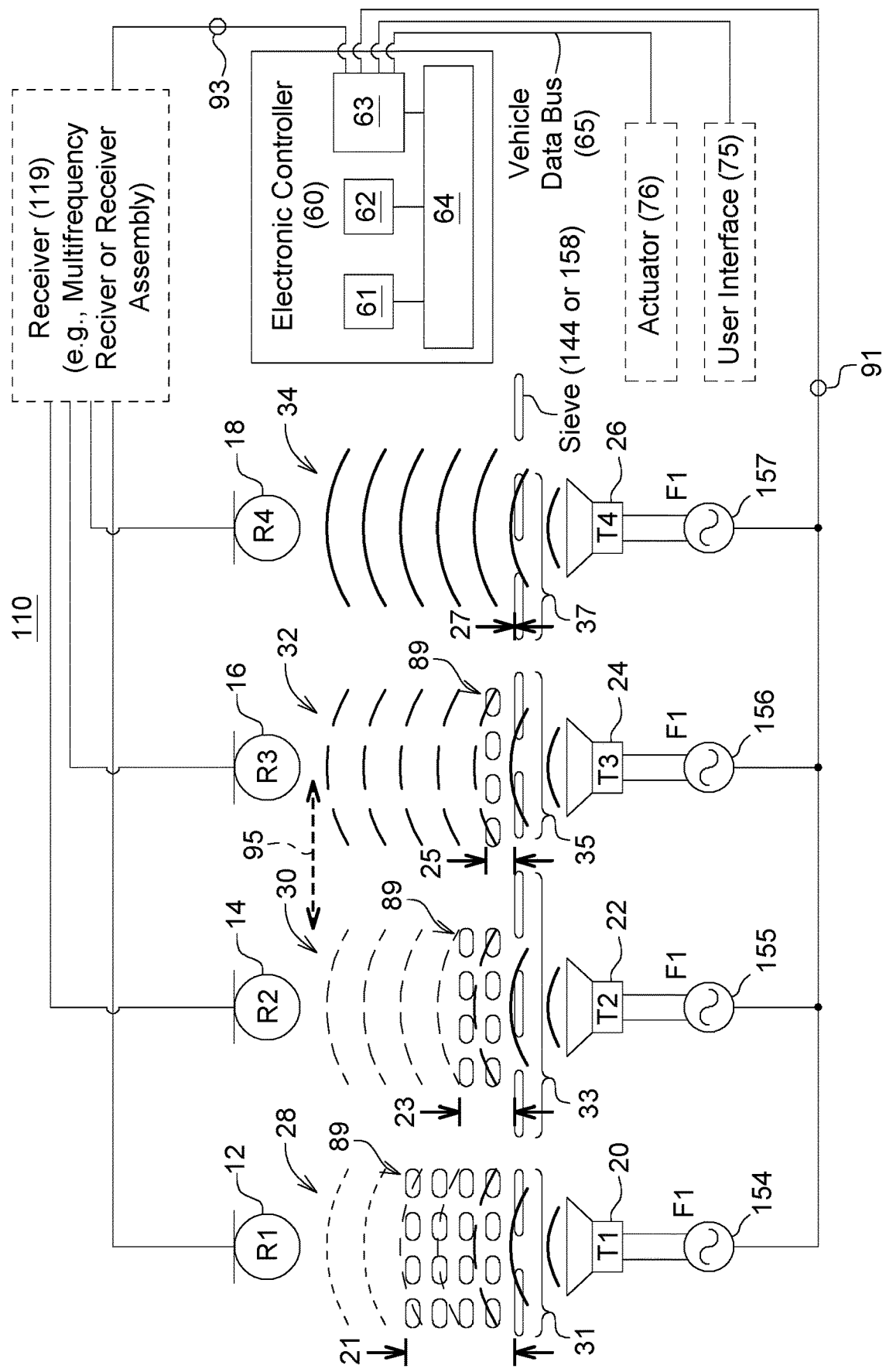
FIG. 1B is a block diagram of another embodiment of a system for measurement of harvested agricultural material associated with a sieve in a first mode (e.g., transmissive mode) in accordance with time-division multiplexing.

In FIG. 1A and FIG. 1B, a set of microphones (12, 14, 16, 18) or receive transducers is configured to receive and convert the transmitted waves (e.g., in the first mode or transmissive mode) to corresponding received electromagnetic signals, which can represent: (a) a transformed, delayed, attenuated, distorted or derivative version of the generated or transmitted electromagnetic signal, and/or (b) an indication or representation of the underlying transformation, delay, attenuation, distortion or derivation of the transmitted wave or signal in the extended sonic wavelength range between any transmit transducer (20, 22, 24, 26) and a corresponding receiving microphone (12, 14, 16, 18). For example, the distortion may be observed as reduced sharpness or deformity of an amplitude versus frequency response (or an equivalent representation in frequency domain, Fourier transformation, or S-domain transformation) of a received pulse or received waveform with respect to a transmitted pulse or transmitted waveform) may be induced by the harvested material (e.g., mixture of grain and residue) on the sieve (144, 158) or harvested-material-receiving portions of the cleaning assembly 126. The transmitted waves may fall within the extended sonic wavelength range or frequency range. In one embodiment, each of the set of microphones (12, 14, 16, 18) is longitudinally spaced apart from each other along a longitudinal axis of the sieve (144 or 158) (or the harvester or combine 510) for reception of the transmitted electromagnetic signal in a first mode through the harvested agricultural material 89, or in a second mode reflected from the harvested agricultural material 89. As illustrated in FIG. 1A, the set of microphones comprises a first microphone 12, a second microphone 14, a third microphone 16 and a fourth microphone 18, although any number of microphones or receive transducers greater than or equal to two may be used. However, in one alternate embodiment, only one microphone or receive transducer may be used.

In alternate embodiments, the microphones may be arranged in a grid at fixed, known location points (above or below one or more sieves, 144 or 158) along the longitudinal axis of the sieve and a corresponding lateral axis of the sieve, to yield two-dimensional or three-dimensional representations of the harvested agricultural 89 material that accumulates or lies on one or more sieves (144, 158), during operation of the cleaning assembly 126 and its associated combine or harvester.

A plurality of receivers 19 or a receiver assembly is arranged to receive the received electromagnetic signals associated with respective ones of the microphones (12, 14, 16, 18) or receive transducers. As illustrated in FIG. 1, the receivers 19 may comprise one or more receivers, a multi-frequency receiver, a rake receiver, or a receiver assembly that can simultaneously receive electromagnetic signals on different channels or frequencies, or with offset phase components, for example.

Each receiver 19 or group of receivers 19 are arranged to detect one or more of the following signal parameters (in the received electromagnetic signal derived from the transmitted wave or signal between a transmit transducer and a corresponding receive transducer or microphone): a corresponding observed phase shift, an observed attenuation or other observed signal parameters for its respective microphone (12, 14, 16, or 18) or receive transducer. In the first mode (e.g., transmissive mode) of operation, which is shown in FIG. 1A and FIG. 1B, observed phase shift, observed attenuation, or both may be measured at one or more frequencies and/or during one or more measurement intervals (e.g., time slots). In a first mode (e.g., transmissive mode) of operation, another observed signal parameter may comprise an observed time-of-flight between a transmission time of a transmitted electromagnetic signal (e.g., pulse 73 or pulse train) and a reception time of the transmitted electromagnetic signal.

In a first mode (e.g., reflective mode) of operation or a transmissive mode of operation, another observed signal parameter may comprise observed distortion in the transmitted electromagnetic signal or its reflection, such as observed harmonic content (e.g., observable transformation of the signal to the frequency domain (e.g., by Fourier transformation), S-domain or other transformed signal domain), group delay, or deformation in the signal shape (in the time versus magnitude domain or frequency domain) or signal envelope of the transmitted electromagnetic signal or its reflection.

In one embodiment, an electronic controller 60 comprises an electronic data processor 61, a data storage device 62 and one or more data ports 63. The electronic data processor 61, the data storage device 62 and the data ports 63 are coupled to the data bus 64. Via one or more data ports 63, the electronic data processor 61 (or the electronic controller 60) is configured to communicate with, control, and receive observed phase shift, observed attenuation data, and observed signal parameter data from the receivers (19, 119) via a transmission line 93 or communications line. The electronic controller 60 or electronic data processor 61, via data ports 63, is configured to communicate with, control the frequency, timing and modulation, and transmit electromagnetic signals (e.g., pulses) from one or more transmitters (54, 55, 56, 57) via a transmission line 91 or communications line.

In one embodiment, the electronic data processor 61 may comprise a microcontroller, a microprocessor, a logic circuit, an arithmetic logic unit, a field programmable gate array, an application specific integrated circuit or a digital signal processor, or another data processor for processing or manipulating data. The data storage device 62 may comprise random access memory, electronic memory, nonvolatile electronic memory, an optical data storage device, a magnetic data storage device, or another device for storing, writing, reading, and/or retrieving data (e.g., digital data, analog data, or both).

The receiver 19 can detect an observed phase shift, observed attenuation, or observed signal parameter, which is indicative of the first amount 21 (e.g., height, volume or spatial distribution of local height and local volume on one or more sieves 144 or 158) of harvested agricultural material, in the first transmitted wave 28 between the first transducer and the first microphone 12; data bus 64. In one embodiment, an electronic data processor 61 is adapted to estimate a distribution or quantity of material on the sieve (144, 158) along the longitudinal axis 95 based on the observed phase shift, the observed attenuation or the other observed signal parameters relative to a reference phase shift, a reference attenuation or other reference signal parameter associated with a corresponding reference distribution, volume, mass or quantity of material on the sieve (144, 158). For example, the reference phase shift, a reference attenuation or other reference signal parameter associated with a corresponding reference distribution, volume, mass or quantity of material on the sieve (144, 158) are stored in the data storage device 62. The distribution, volume or quantity of material can be represented in one or more dimensions, individually or collectively, such as along a longitudinal axis 95 of the sieve, combine or harvester, along a lateral axis of the sieve, combine or harvester, or along a height axis of the sieve, combine or harvester. The lateral axis of the sieve is substantially perpendicular to the longitudinal axis.

In one example in a first mode (or transmissive mode) as illustrated in FIG. 1A, the receiver 19 can detect an observed phase shift, observed attenuation, or observed signal parameter, which is indicative of the first amount 21 (e.g., height or volume) of harvested agricultural material 89 (e.g., in a first zone 31 of or on the sieve 144, 158), of the first transmitted wave 28 between the first transducer 20 and the first microphone 12; the receiver 19 can detect an observed phase shift, observed attenuation, or observed signal parameter, which is indicative of the second amount 23 (e.g., height or volume) of harvested agricultural material (e.g., in a second zone 33 of or on the sieve 144, 158), of the second transmitted wave 30 between the second transducer 22 and the second microphone 14; the receiver 19 can detect an observed phase shift, observed attenuation, or observed signal parameter, which is indicative of the third amount 25 (e.g., height or volume) of harvested agricultural material (e.g., in a third zone 35 of or on the sieve 144, 158), of the third transmitted wave 32 between the third transducer 24 and the third microphone 16; the receiver 19 can detect an observed phase shift, observed attenuation, or observed signal parameter, which is indicative of the fourth amount 27 (e.g., height or volume) of harvested agricultural material (e.g., in a fourth zone 37 of or on the sieve 144, 158), of the fourth transmitted wave 34 between the fourth transmit transducer 26 and the fourth microphone 18. The zones (31, 33, 35, 37) may be defined as rectangular, oval or hexagon regions or cells on the sieve, where the zones may share one or more common borders or edges. Further, as illustrated in FIG. 1A, each zone is associated with a range of coordinates along the longitudinal axis 95, or a grid of points defining a boundary of the zone with respect to the longitudinal axis 95.

In one configuration, the data port 63 is adapted to communicate with a user interface 75, an actuator 76, or both, via a vehicle data bus 65 or a wireless link (e.g., wireless local area network devices). A user interface 75 may comprise a display, touch screen display, a keypad, a keyboard, a pointing device (e.g., electronic mouse), switches, or other inputs to support data input or data output for an end user or operator of the combine 510 or harvester. The end user or operator can be alerted via the user interface 75 if the harvested agricultural material 89 on the sieve (144, 158) is unevenly distributed, matches a preestablished distribution profile, or exceeds a height threshold or volume threshold for a corresponding longitudinal area or a corresponding zone (31, 33, 35, 37) of the sieve (144, 158). For example, a zone height threshold may be stored for each corresponding zone (31, 33, 35, 37) in the data storage device 62 for the data processor 61 to reference to generate an alert via the user interface 75. In one embodiment, the zone height threshold for each zone may be unique or independent of the other zone. Further, the zone height threshold for each zone may be based on the model and configuration of the combine or harvester, such as swath width or row width, and data collected during proper operation of or modeling of the combine 510 or harvester for harvesting similar crop type (species), crop variety, crop conditions, crop yield, crop moisture. For example, the zone height threshold for harvesting corn or maize typically will be different than the zone height threshold for harvesting wheat, barley or oats.

In one embodiment, the actuator 76 comprises an electrohydraulic cylinder, a linear actuator, an electric motor, a motor controller, a servo motor, or the like. The operator can be alerted via the user interface 75 if the harvested material 89 on the sieve (144, 158): (a) is unevenly distributed, or (b) matches a preestablished distribution profile, or (c) meets or exceeds one or more zone thresholds that are user-definable (e.g., in the data storage device 62) via the user interface 75. Alternately, the sieve (144, 158) can be adjusted by an actuator 76 to promote a generally uniform distribution (e.g., height or thickness of material within a dimensional tolerance of plus or minus twenty-five percent) if the harvested material 89 on the sieve (144, 158): (a) is unevenly distributed, or (b) matches a preestablished distribution profile, or (c) meets or exceeds one or more zone thresholds that are user-definable (e.g., in the data storage device 62) via the user interface 75.

In one embodiment, the cleaning assembly has a set of sieves (144, 158), such as a lower sieve 158 and an upper sieve 144 (or chaff separator), as explained below in more detail in conjunction with FIG. 5 and FIG. 6. In one configuration after receiving an alert on the user interface 75, the operator or end user may stop the combine 510 or harvester to adjust one or more machine settings (e.g., sieve clearance) to reduce an excessive harvested material 89 from accumulating on one or more sieves (144, 158). In another configuration, the actuator 76 may be configured or adapted to adjust automatically one or more machine settings to reduce an excessive harvested material 89 from accumulating on one or more sieves (144, 158). For example, the machine settings may comprise moving or adjusting the relative clearance of the lower sieve 158, the upper sieve 144, or both sieves, to remedy or compensate for uneven distribution of material, such as target crop material or harvested agricultural material 89 that detracts from the performance of the combine 510, harvester or its cleaning assembly 126.

The harvested agricultural material may include both target crop material and residue. The target crop material comprises seed, grain, oilseed, corn, maize, oats, wheat, rye, barley, soybeans, or fiber. The target crop material is the raw material that can be processed for edible food, fiber or oil, for example. The residue, such as chaff, stalks or other plant components, sometimes has some potential use as forage (to feed to some animals), field cover (to prevent soil erosion) or organic material (that decays to enrich the soil). The target crop material can be measured in mass or volume, such as mass per land unit area or volume per land unit area (e.g., bushels per acre or metric tons per hectare).

In FIG. 1A, one embodiment of the measurement system 10 can be operated in the first mode, such as a transmissive mode, where the transmitted waves are transmitted through the harvested agricultural material 89 on a sieve (144 or 158) of a cleaning assembly 126. In the first mode, each of the plurality of receivers 19 and the respective microphones (12, 14, 16, 18) are associated with a separate observed phase shift level, a separate observed attenuation level, or both of the received electromagnetic signals to form a profile of observed phase shift levels and observed attenuation levels versus longitudinal displacement along the longitudinal axis 95 of the sieve (144, 158). Meanwhile, the data storage device 62 stores reference phase shift levels, reference attenuation levels or both that are calibrated to different distributions or profiles of harvested material 89 versus longitudinal placement along the longitudinal axis 95 of the sieve (144, 158), where the reference phase shift levels and the reference attenuation levels may be specific to certain crops, crop types, or varieties of certain crops. The reference phase shift levels and reference attenuation levels may be based on any of the following reference information: factory settings, prior harvesting operations in a field or geographical area, empirical observations, historical field tests or laboratory calibrations, first mode (e.g., transmissive mode), and second mode (e.g., reflective mode), for example.

Accordingly, the electronic data processor 61 estimates a profile distribution, profile height, or volume (or composition) of harvested agricultural material 89 on the sieve (144, 158) along its longitudinal axis based on the separate observed phase shift levels, the separate observed attenuation levels, or both with reference to the reference phase shift levels, the reference attenuation levels, the identified or selected harvested material, and the selected or applicable mode of operation (e.g., transmissive mode versus reflective mode). In one configuration the profile distribution may comprise an average, mean, median, mode height of harvested agricultural material 89 on (or along a longitudinal axis 95) of the sieve (144, 158). In another configuration the profile distribution may comprise an average, mead, mode height of harvested material along with the variance or standard deviation of the profile distribution on (or along a longitudinal axis 95) of the sieve (144, 158).

In yet another configuration, the profile distribution of harvested agricultural material 89 may comprise an average, mean, median or mode height of material versus longitudinal position for each discrete position or position range along the longitudinal axis 95 of the sieve (144, 158). For example, an increase in observed attenuation level or the observed phase shift, indicates an increase in the amount or height of harvested agricultural material 89 associated with any pair, of a transmit transducer (20, 22, 24, 26) and its respective receive transducer (e.g., microphone 12, 14, 16, 18), that is associated with the corresponding longitudinal position (e.g., particular transverse rectangular area) of the sieve (144, 158). Conversely, a decrease in the observed attenuation level or observed phase shift, indicates a decrease in the amount or height of harvested agricultural material 89 associated with any pair, of a transmit transducer (20, 22, 24, 26) and its respective receive transducer (e.g., microphone 12, 14, 16, 18), that is associated with the corresponding longitudinal position (e.g., transverse rectangular area) of the sieve (144, 158). In one example, the surface area of the sieve (144, 158) can be divided into a set of adjacent transverse rectangular areas, where each transverse rectangular area is associated with a different transmit transducer and receive transducer, or a different pair of transmit transducer and receive transducer.

Aside from the observed attenuation level or observed phase shift level, other observed signal parameters may be used to provide an estimate of the material, volume or mass of material within each corresponding zone, longitudinal position, and/or lateral position of the sieve (144, 158), or within each designed transverse rectangular area, such as a first transverse rectangular area, a second transverse rectangular area, up to an Nth transverse rectangular area, where N is equal to any positive integer greater than two.

In one embodiment, the other observed signal parameters comprise sound pressure level, where sound pressure level refers to a difference between reference air pressure (e.g., mean local air pressure) and the pressure in the transmitted wave relative to a reference sound pressure level. In another embodiment, the other observed signal parameters comprise distortion, as measured by total harmonic distortion or other modification of the transmitted wave from its original waveform because of the receipt of reflections (e.g., multipath reflections) of the transmitted waves in the second mode, absorption of the transmitted waves in the first mode, or introduction of harmonic components from the shape of reflective (e.g., sonically reflective) components within the cleaning assembly 126 or combine 510.

In one configuration, the at least one transmitter (54, 55, 56, 57) comprises a plurality of transmitters associated with corresponding transmit transducers (20, 22, 24, 26), wherein each transmitter and respective transducer operate on the same frequency or wavelength for an allotted time window in a time division multiplex scheme. In an alternate configuration, at least one transmitter (54, 55, 56, 57) comprises a plurality of transmitters associated with corresponding transmit transducers (20, 22, 24, 26), wherein each transmitter (54, 55, 56, 57) and respective transmit transducer operate simultaneously on different frequencies or wavelength. Time division multiplex is not required to avoid interference for simultaneous transmissions on different frequencies or different wavelengths.

The position, operational frequency range or other parameters of the transmit transducers (20, 22, 24, 26), receive transducers (e.g., microphones 12, 14, 16, 18), or transducers may vary in accordance with various configurations of the cleaning assembly or measurement system 10, where the various configurations may be applied separately or cumulatively.

Under a first configuration consistent with FIG. 1A, within the cleaning assembly 126 of the combine 510 or harvester, the first mode comprises positioning the transmit transducers (20, 22, 24, 26) below the sieve (144, 158) and the microphones (12, 14, 16, 18) above the sieve (144, 158). Under a second configuration, within the cleaning assembly 126 of the combine 510 or harvester, the first mode comprises positioning the transmit transducers (20, 22, 24, 26) above the sieve (144, 158) and the microphones (12, 14, 16, 18) below the sieve (144, 158).

Under a third configuration, the target wavelength range further comprises an extended sonic wavelength range of human audible wavelengths, subsonic wavelengths below the sonic range, and ultrasonic wavelengths above the sonic range.

Under fourth configuration, in the first mode the plurality of receivers 19 measure attenuation through the harvested agricultural material 89 at corresponding microphones.

The measurement system 10 of FIG. 1A is similar to the measurement system 110 of FIG. 1B, except the measurement system 10 of FIG. 1A has pairs of transmitters and receivers 19 that operate at different frequencies or with different codes (e.g., orthogonal codes) to avoid interference between the transmitted signals or transmitted waves. The measurement system 110 of FIG. 1B has transmitters (154, 155, 156, 157) and one or more receivers 119 that operate in accordance with a time-division multiplex scheme (e.g., within different time slots) or a code-division multiple access scheme to avoid interference between the transmitted signals. Like reference numbers in FIG. 1A and FIG. 1B indicate like elements or features.

In FIG. 1B, the transmitters (154, 155, 156 and 157) can operate on the same frequency or same wavelength at different times or during different time slots to avoid interference with each other. Similarly, if the transmitters (154, 155, 156, and 157) operate on the same frequency, then only one receiver 119 is required to cover the reception of the transmissions during separate and discrete time slots.

FIG. 2 is a diagram of signal amplitude 70 versus transmission time 71 for each transmitted wave from a respective transmitter (154, 155, 156, and 157) in the measurement system 110. Further, the transmitted waves are transmitted in accordance with a time-division-multiplex configuration of FIG. 1B at a common frequency within the target wavelength range. The signal amplitude 70 of transmitted waves or signals is shown along the vertical axis and time 71 is shown along the horizontal axis.

In FIG. 2, the transmitted waves are labeled as a first waveform 66, a second waveform 67, a third waveform 68 and a fourth waveform 69. In one embodiment, a first waveform 66 has a pulse 73 representative of a first transmitter 154 transmitting a transmitted wave during a first time period prior to a second, third, or fourth time period. A second waveform 67 has a pulse 73 representative of a second transmitter 155 transmitting the transmitted wave during a second time period after a first time period and prior to a third time period or a fourth time period. A third waveform 68 has a pulse 73 representative of a third transmitter 156 transmitting the transmitted wave during a third time period after a first time period and second time period, but prior to a fourth time period. A fourth waveform 69 has a pulse 73 representative of a fourth transmitter 157 transmitting at a fourth time period after the first, second and third time periods. The pulses 73 in the time periods set forth in FIG. 2 may be repeated successively over additional time periods associated with a complete transmit cycle of all of the transmitters, for example.

Figure 3A:
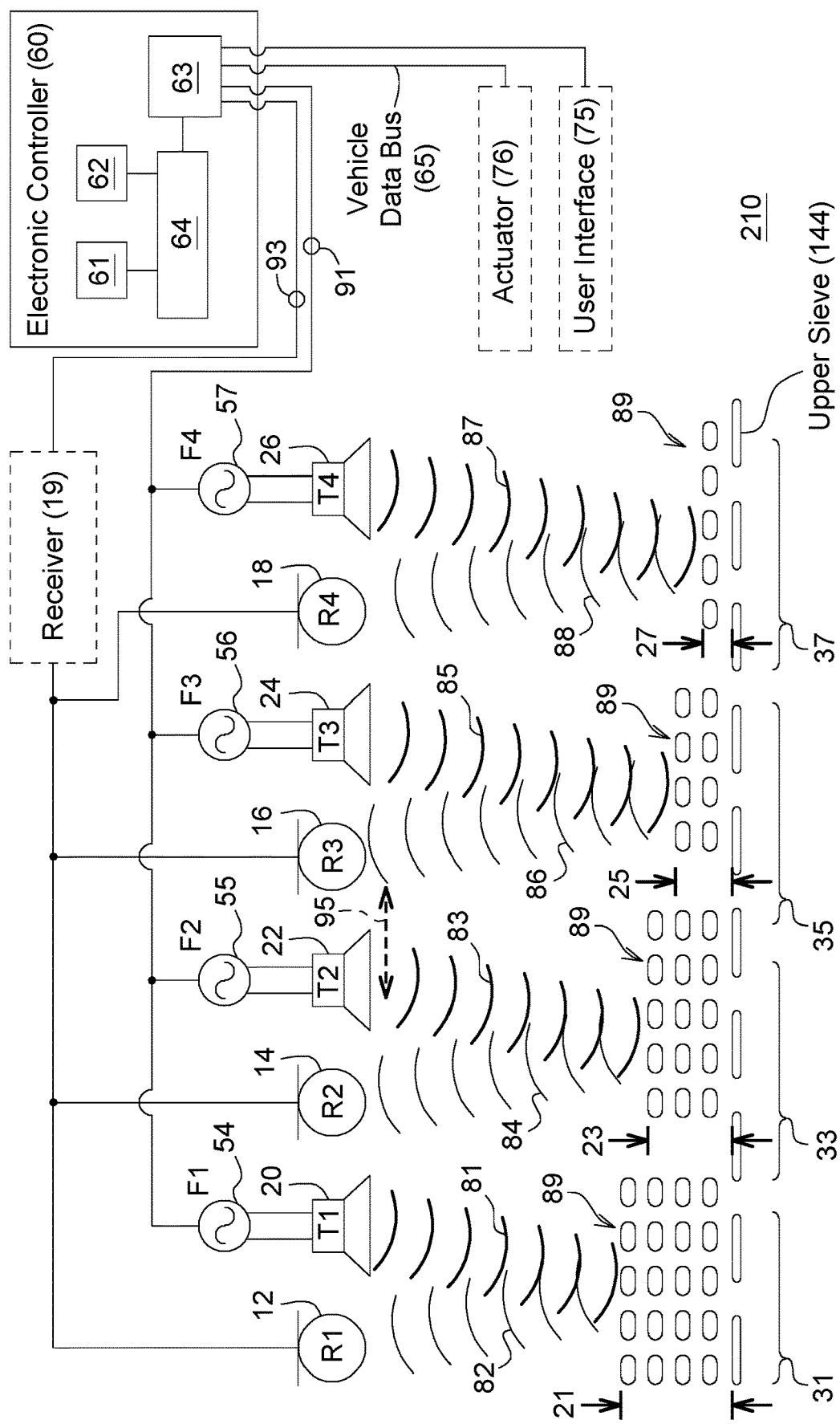
FIG. 3A is a block diagram of one embodiment of a system for measurement of harvested agricultural material associated with a sieve (e.g., upper sieve) in a second mode (e.g., reflective mode or reflection mode) at different frequencies or with different coding.

FIG. 3A is a block diagram of one embodiment of a measurement system 210 for measurement of harvested agricultural material 89 associated with a sieve (e.g., 144, 158) in a second mode (e.g., reflective mode) in accordance with different frequencies or different coding in a second mode (e.g., reflective mode). The measurement system 210 of FIG. 3A is similar to the measurement system 10 of FIG. 1A, except the measurement system 210 of FIG. 3A operates in the second mode (e.g., reflective mode), whereas the measurement system 10 of FIG. 1A operates in the first mode (e.g., transmissive mode). Like reference numbers in FIG. 3A and FIG. 1A indicate like elements or features.

In the measurement system 210, at least one transmitter (54, 55, 56, 57) is configured to generate or transmit an electromagnetic signal (e.g., simultaneously or at different times in response to a control data message or control signal from the electronic controller 60). As illustrated in FIG. 3A, the set of transmitters comprises a first transmitter 54, a second transmitter 55, a third transmitter 56, and a fourth transmitter 57, although any number of transmitters greater than or equal to two may be used.

A set of transmit transducers (20, 22, 24, 26) can convert the transmitted electromagnetic signal into transmitted waves within a target wavelength range comprising one or more of the following: an extended sonic wavelength range, an ultrasonic wavelength range, a humanly audible wavelength range, or a subsonic wavelength range. As used in this document, an extended sonic wavelength range or frequency range shall refer to one or more of the following: an ultrasonic wavelength range, a humanly audible wavelength range, or a subsonic wavelength range.

Figure 3B:
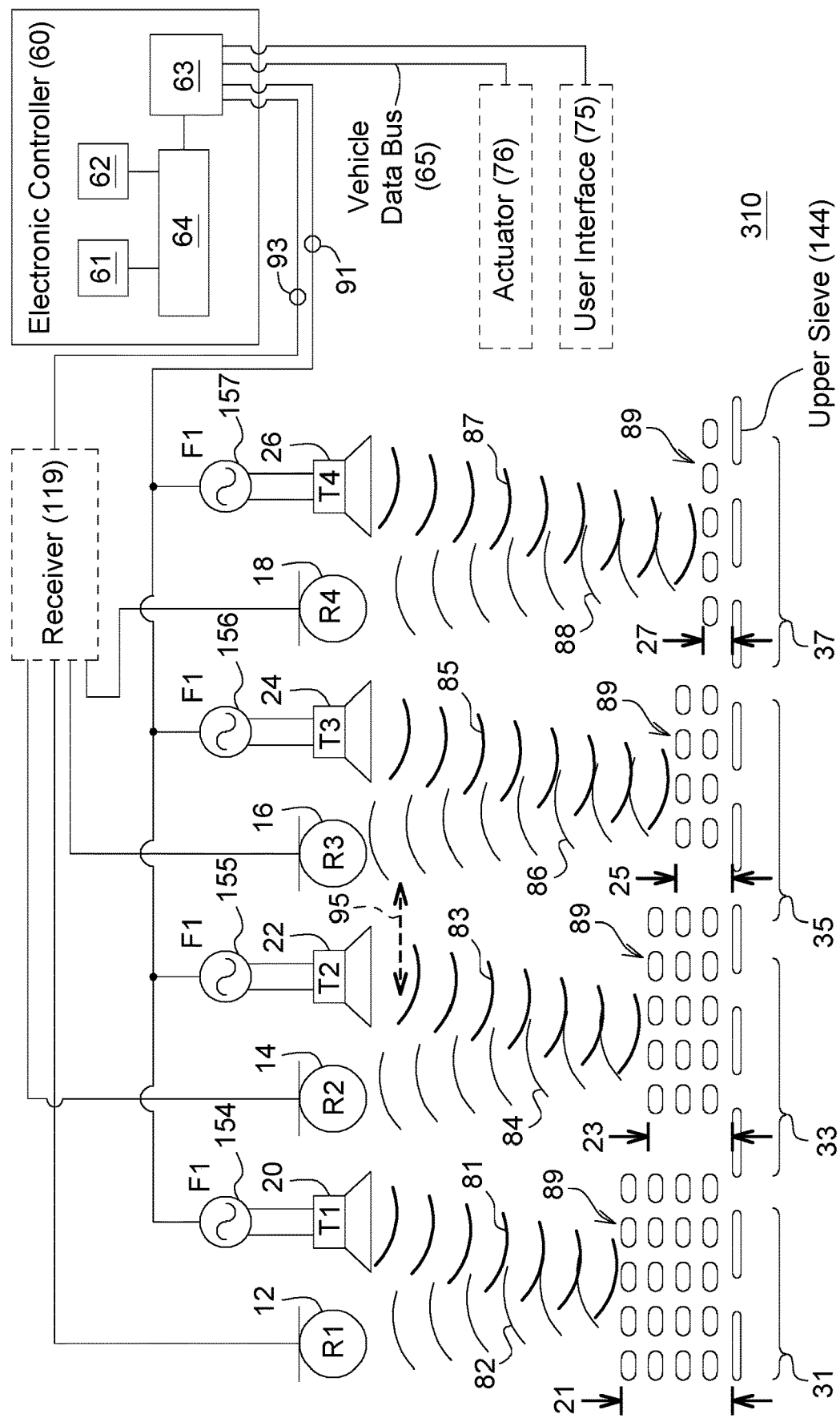
FIG. 3B is a block diagram of another embodiment of a system for measurement of harvested agricultural material associated with a sieve (e.g., upper sieve) in a second mode (e.g., reflection mode) in accordance with time-division multiplexing.

In FIG. 3A and FIG. 3B, or reflections a set of microphones (12, 14, 16, 18) or receive transducers is configured to receive and convert the transmitted waves (e.g., in the second mode or reflective mode) of the transmitted wave into a received electromagnetic signal. The second mode comprises positioning the transmit transducers (20, 22, 24, 26) above the sieve (144, 158) and the microphones (12, 14, 16, 18) above the sieve (144, 158).

In the second mode (e.g., reflective mode) of operation, which is shown in FIG. 3A and FIG. 3B, observed phase shift, observed attenuation, or both may be measured at one or more frequencies and/or during one or more measurement intervals (e.g., time slots). The data processor 61 or electronic controller 60 may compare the observed phase shift, the observed attenuation or both associated with each transmit-receive pair of transducers with corresponding reference phase shift, reference attenuation, or both stored in the data storage device 62, where the reference phase shift and reference attenuation may be associated with respective estimated heights or volumes of harvested agricultural material 89, along with any adjustments for crop type and crop moisture.

In the second mode (e.g., reflective mode) of operation, another observed signal parameter may comprise an observed time-of-flight between a transmission time of a transmitted electromagnetic signal (e.g., pulse 73 or pulse train) and a reception time of a reflection of the transmitted electromagnetic signal from agricultural material on the sieve (144, 158). In the second mode the plurality of receivers 19 measures an observed propagation time (e.g., observed time of flight) from transmission at transmission time of the transmit transducers (20, 22, 24, 26) to a reception time of the transmission reflected from the harvested agricultural material 89 to be received at the respective microphones (12, 14, 16, 18) or receive transducers associated with the receivers (19 or 119). The data processor 61 or electronic controller 60 may compare the observed propagation time associated with each transmit-receive pair of transducers with corresponding reference propagation times or time ranges stored in the data storage device 62, where the reference propagation times may be associated with respective estimated heights or volumes of harvested agricultural material 89, along with any adjustments for crop type and crop moisture.

In FIG. 3A, the measurement system 210 may be positioned entirely above the sieve (144, 158) or an upper sieve 144 of the separating assembly 126, which affords some resistance to the impact that dust, chaff, and moisture might otherwise have on the measurement system 210. Moreover, the measurement system 210 in the reflective mode of FIG. 3A does not need any space for mounting electrical or electronic components below the sieve (144, 158) or between multiple sieves. In one embodiment, each of the set of microphones (12, 14, 16, 18) is longitudinally spaced apart from each other along a longitudinal axis 95 of the sieve (144 or 158) (or the harvester or combine 510) for reception of the transmitted electromagnetic signal in a second mode reflected from the harvested agricultural material 89

An electronic data processor 61 is adapted to estimate a distribution, volume or quantity of material on the sieve (144, 158) along the longitudinal axis 95 based on the observed phase shift, the observed attenuation or the other observed signal parameters relative to a reference phase shift, a reference attenuation or other reference signal parameter associated with a corresponding reference distribution, volume, mass or quantity of material on the sieve (144, 158). For example, in a second mode (or reflective mode) the receiver 19 can detect an observed phase shift, observed attenuation, time-of-flight of a pulse 73, or observed signal parameter, which is indicative of the first amount 21 (e.g., height or volume) of harvested agricultural material 89 (e.g., in a first zone 31 of or on the sieve 144, 158), of the first transmitted signal 81 and the first reflected signal 82 between the first transmit transducer 20 and the first microphone 12; the receiver 19 can detect an observed phase shift, observed attenuation, or observed signal parameter, which is indicative of the second amount 23 (e.g., height or volume) of harvested agricultural material (e.g., in a second zone 33 of or on the sieve 144, 158), of the second transmitted signal 83 and second reflected signal 84 between the second transducer 22 and the second microphone 14; the receiver 19 can detect an observed phase shift, observed attenuation, or observed signal parameter, which is indicative of the third amount 25 (e.g., height or volume) of harvested agricultural material (e.g., in a third zone 35 of or on the sieve 144, 158), of the third transmitted signal 85 and third reflected signal 86 between the third transducer 4 and the third microphone 16; the receiver 19 can detect an observed phase shift, observed attenuation, or observed signal parameter, which is indicative of the fourth amount 27 (e.g., height or volume) of harvested agricultural material (e.g., in a fourth zone of or on the sieve 144, 158), of the fourth transmitted signal 87 and fourth reflected signal 88 between the fourth transmit transducer 26 and the fourth microphone 18.

FIG. 3 B is a block diagram of another embodiment of a measurement system 310 for measurement of harvested agricultural material 89 associated with a sieve (144, 158) in accordance with a time-divisional multiplex scheme in a second mode (e.g., reflective mode). The measurement system 310 of FIG. 3B is similar to the measurement system 110 of FIG. 1B, except the measurement system 310 of FIG. 3B operates in the second mode (e.g., reflective mode), whereas the measurement system 110 of FIG. 1B operates in the first mode (e.g., transmissive mode). Like reference numbers in FIG. 3B and FIG. 1B indicate like elements or features.

In FIG. 3B, the measurement system 310 may be positioned entirely above the sieve (144, 158) or an upper sieve 144 of the separating assembly 126, which affords some resistance to the impact that dust, chaff, and moisture might otherwise have on the measurement system 310. Moreover, the measurement system 10 in the reflective mode of FIG. 3B does not need any space for mounting electrical or electronic components below the sieve (144, 158) or between multiple sieves.

An electronic data processor 61 is adapted to estimate a distribution or quantity of material on the sieve (144, 158) along the longitudinal axis based on the observed phase shift, the observed attenuation or the other observed signal parameters relative to a reference phase shift, a reference attenuation or other reference signal parameter associated with a corresponding reference distribution, volume, mass or quantity of material on the sieve (144, 158). In the second mode (e.g., transmissive mode), the transmitters (154, 155, 156, 157) may operate on the same frequency during different time slots in accordance with a time-division multiplex scheme. For example, in a second mode (or reflective mode) the receiver 119 can detect an observed phase shift, observed attenuation, or observed signal parameter, which is indicative of the first amount 21 (e.g., height or volume) of harvested agricultural material 89 (e.g., in a first zone 31 of or on the sieve 144, 158), of the first transmitted signal 81 and the first reflected signal 82 between the first transmit transducer 20 and the first microphone 12; the receiver 19 can detect an observed phase shift, observed attenuation, or observed signal parameter, which is indicative of the second amount 23 (e.g., height or volume) of harvested agricultural material (e.g., in a second zone 33 of or on the sieve 144, 158), of the second transmitted signal 83 and second reflected signal 84 between the second transducer 22 and the first second microphone 14; the receiver 19 can detect an observed phase shift, observed attenuation, or observed signal parameter, which is indicative of the third amount 25 (e.g., height or volume) of harvested agricultural material (e.g., in a third zone 35 of or on the sieve 144, 158), of the third transmitted signal 85 and third reflected signal 86 between the third transducer 24 and the third microphone 16; the receiver 19 can detect an observed phase shift, observed attenuation, or observed signal parameter, which is indicative of the fourth amount 27 (e.g., height or volume) of harvested agricultural material (e.g., in a fourth zone 37 of or on the sieve 144, 158), of the fourth transmitted signal 87 and fourth reflected signal 88 between the fourth transmit transducer 26 and the fourth microphone 18.

Figure 4:
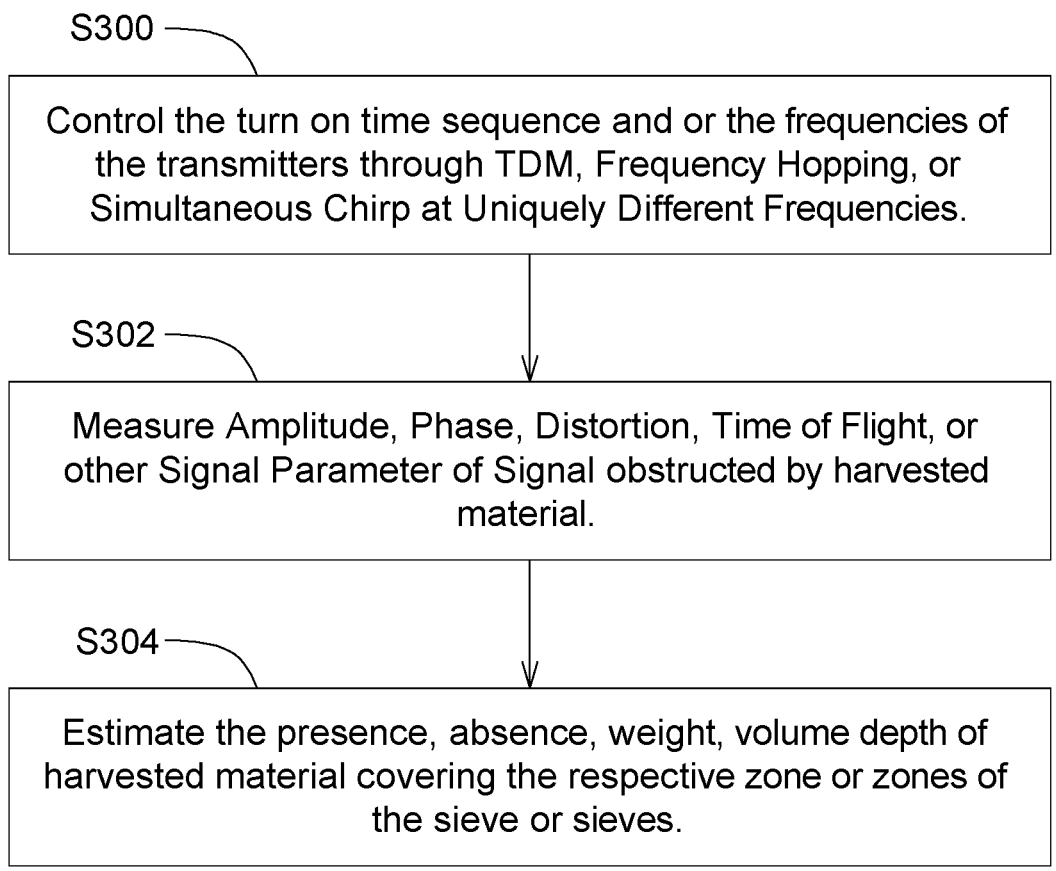
FIG. 4 is a flow chart of a method for measurement of the harvested agricultural material in a first mode or second mode.

FIG. 4 is a flow chart of a method for measurement of the harvested agricultural material 89 in a first mode or second mode. The method of FIG. 4 begins in step S300.

In step S300, an electronic controller 60 controls the turn-on time sequence and/or the frequencies of the transmitters (54, 55, 56, 57, 154, 155, 156, 157) through time-division multiplexing (TDM), frequency hopping, coded frequency division multiplex, code division multiple access, code division multiplexing or simultaneous chirp at uniquely different frequencies.

In step S302, one or more receivers (19, 119) measures or detects an observed amplitude, observed phase, observed distortion, or another observed signal parameter (e.g., time of flight or observed propagation time) of a signal obstructed by harvested agricultural material (e.g., in one or more zones) on the sieves (144, 158).

In step S304, one or more receivers (19, 119) provides the measured, observed amplitude (attenuation), observed phase (shift) or other observed signal parameter to the electronic controller 60 or electronic data processor 61 for processing to estimate the presence, absence height, volume, depth or distribution of material covering the sieve (144, 158) or identifiable areas (e.g. zones) along the longitudinal axis of the sieve (144, 158) or cleaning assembly 126. For example, the electronic data processor 61 compares the observed amplitude (attenuation), observed phase (shift) or other observed signal parameter to a reference amplitude attenuation, reference phase shift or reference observed signal parameter associated with a known height or volume of harvested agricultural material 89 in a respective zone or zones of the sieve (144 or 158) to estimate the observed height or observed volume of harvested agricultural material 89.

Figure 5:
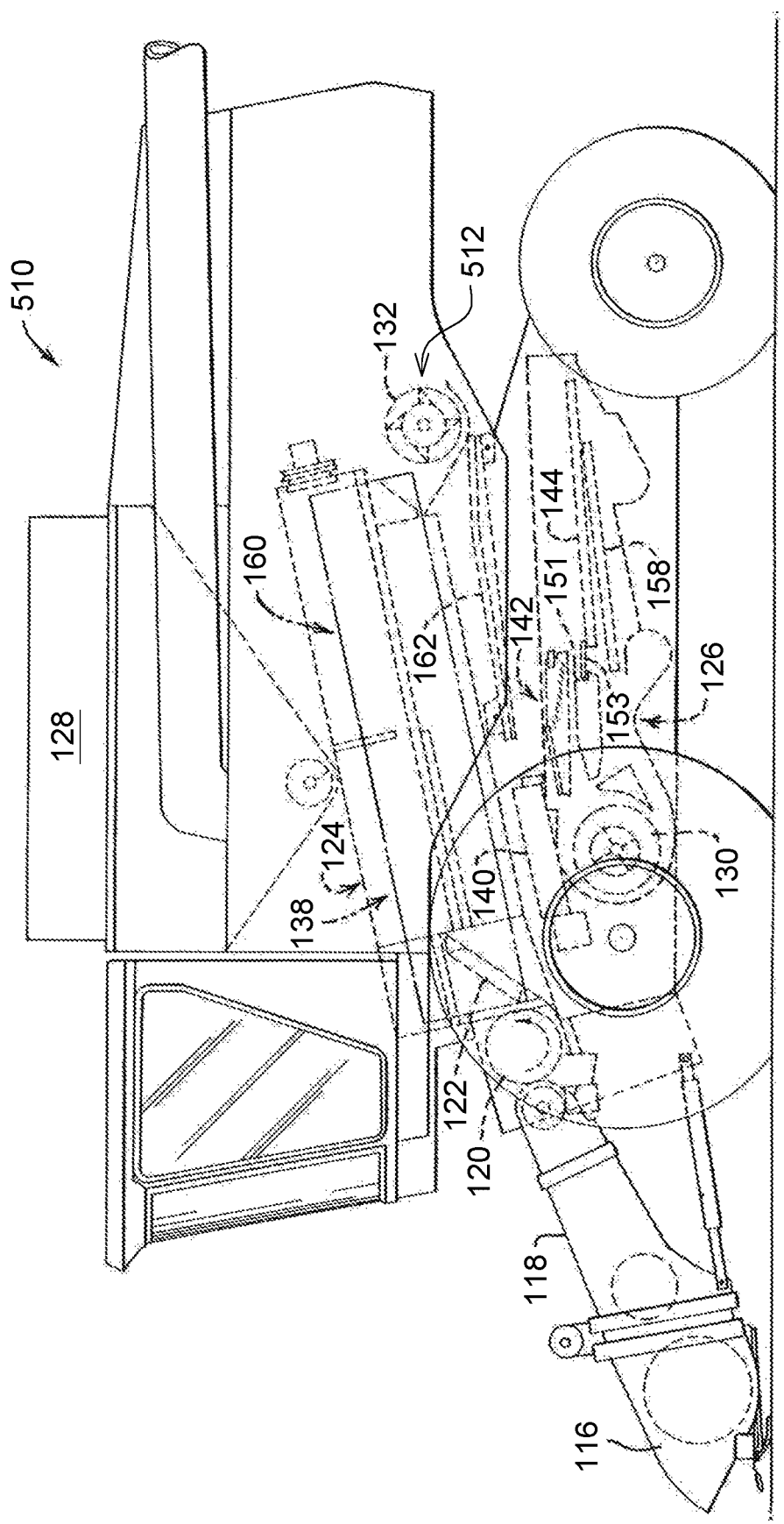
FIG. 5 shows a side view of an illustrative combine or harvester with the internal components, such as the cleaning assembly, shown in dashed lines or in phantom.

FIG. 5 shows a side view of an illustrative combine 510 or harvester with the hidden or internal components, such as the cleaning assembly 126, shown in dashed lines. In FIG. 5, the header 116 cuts the standing crop. The feederhouse 118 directs the harvested crop to a transverse beater 120, which propels the crop material through an inlet 122 to an axial threshing and separating assembly 124. Target harvested material (e.g., grain, beans, fiber or oilseed) and residue (e.g., chaff or dust particles) are directed from the axial threshing and separating assembly 124 to cleaning assembly 126 (e.g., cleaning shoe). Next, the cleaning assembly 126 directs the clean grain to a storage tank 128 and the residue (e.g., chaff) is blown out the rear opening 512 of the combine 510 or combine by a cleaning fan 130. In one configuration, crop material other than grain (e.g., MOG) and chaff or other residue is directed by the axial threshing and separating assembly 124 to a transverse beater 132 which propels this material out the rear opening 512 of the combine 510.

Figure 6:
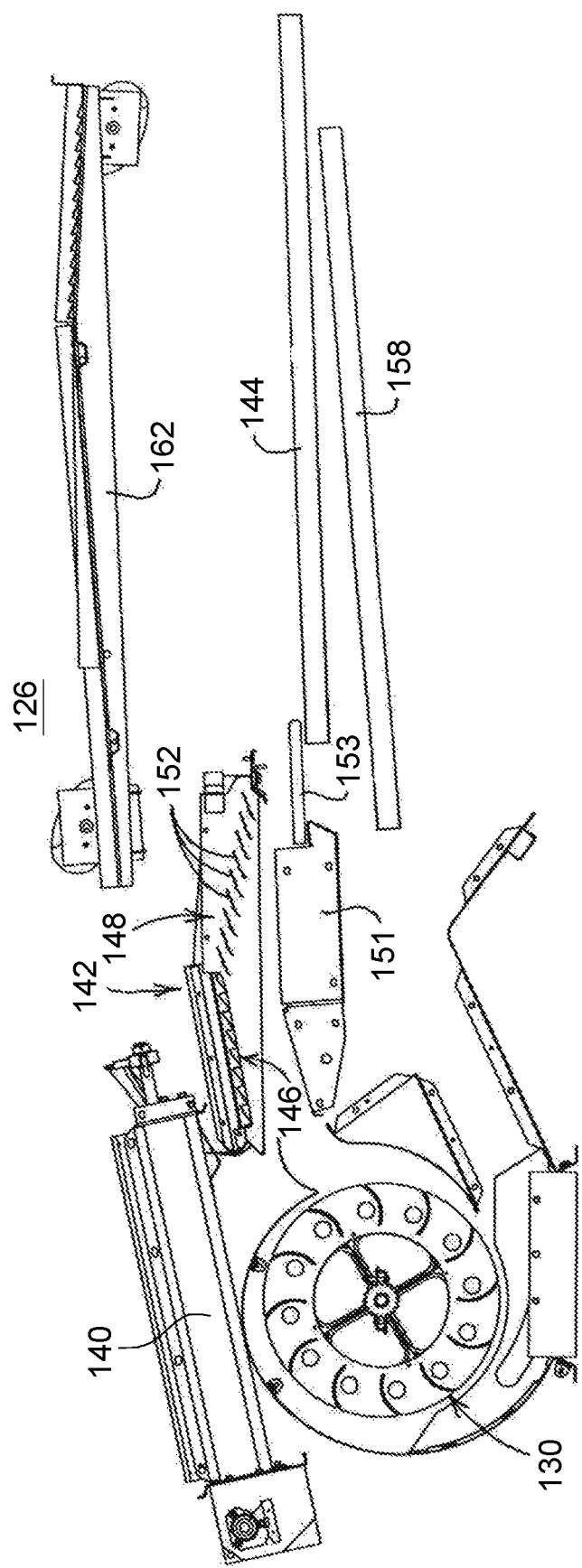
FIG. 6 shoes a side view of an illustrative cleaning assembly in greater detail than FIG. 5, where the cleaning assembly is removed from the combine or harvester.

As illustrated in FIG. 5 and FIG. 6, the axial threshing assembly 138 outputs harvested material that includes a ratio of target harvested material (e.g., grain, beans, fiber or oilseed) that exceeds residue material. This harvested material or mixture is directed to axial augers 140, where the augers 140 direct the harvested material or mixture to a front separator 142 (e.g., agitator or chaffer) which is mounted to the cleaning assembly 126 and moves with the sieve 144 (e.g., main chaffer). The mixture from augers 140 falls onto the closed upstream portion 146 of the front separator 142. The closed upstream portion 146 is inclined upwardly. The top surface of the closed upstream portion 146 is provided with steps for propelling the target mixture upwardly and rearwardly as the front separator 142 is moved or reciprocated by the cleaning assembly 126. The reciprocating movement drives the target mixture to the sieve portion or louvered downstream portion 148 of the front separator 142.

Circulated air from the cleaning fan 130 is directed to blow the residue (e.g., chaff within the target mixture) rearwardly and to let the target harvested material (e.g., grain) pass through the louvers 152 of the louvered downstream portion 148 to follow a path through upper sieve 144 and lower sieve 158 for accumulation or storing within the storage tank 128. In the cleaning assembly 126, the target harvested material (e.g., grain) falls from the louvered downstream portion 148 of the front separator 142 into a pan 151. In turn, the pan 151 is moved or reciprocated and has steps that drive the grain and chaff received by the pan 151 upwardly and rearwardly to finger bars 153. The grain either falls through the finger bars 153 to the lower sieve 158 or the grain and chaff is directed across the finger bars 153 to the upper sieve 144 (e.g., main chaffer). The upper sieve 144 and lower sieve 158 further clean the target mixture (e.g., grain) by releasing residue and plant debris (e.g., chaff) from the target harvested material (e.g., grain) so it can be blown out the rear opening 512 of the combine 510 by the air current or circulated air generated by the cleaning fan 130.

The harvested material or mixture from the separating section 160 is directed to the front separator 142 by pan 162. Because of the circulated air flowing through the open or louvered downstream portion 148 of the front separator 142, some of the mixture does not reach the front separator 142 and is blown rearwardly directly to the upper sieve 144.

FIG. 6 shoes a side view of an illustrative cleaning assembly in greater detail than FIG. 5. Like reference numbers in FIG. 5 and FIG. 6 indicate elements or features.

While the disclosure has been described in detail in the drawings and foregoing description, the description shall be considered as exemplary and illustrative, rather than restrictive of the scope of protection set forth in the claims. Various illustrative embodiments have been shown and described in this document, such that any changes, variants and modifications that come within the spirit of the disclosure will fall within the scope of the disclosure and its associated claims.

The following is claimed:

1. A system for measurement of harvested agricultural material in a cleaning assembly of a combine or harvester, the system comprising:
    a sieve of the cleaning assembly for separating the harvested agricultural material into crop residue and target crop material;
    at least one transmitter for generating or transmitting an electromagnetic signal;
    a set of transducers for converting the transmitted electromagnetic signal into transmitted waves within a target wavelength range comprising an ultrasonic wavelength range;
    a set of microphones for converting the transmitted waves into a received electromagnetic signal, each of the set of microphones longitudinally spaced apart from each other along a longitudinal axis of the sieve for reception of the transmitted electromagnetic signal in a first mode through the harvested agricultural material, or in a second mode reflected from the harvested agricultural material;
    a plurality of receivers for receiving the received electromagnetic signals associated with respective ones of the microphones, each of the plurality of receivers arranged to detect a corresponding observed phase shift and a corresponding observed attenuation, or the observed attenuation, or other observed signal parameters for its respective microphone;
    an electronic data processor for estimating a distribution or quantity of material on the sieve along the longitudinal axis based on the observed phase shift and the observed attenuation, or based on the observed attenuation, or based on the other observed signal parameters relative to a reference phase shift and a reference attenuation, the reference attenuation, or other reference signal parameter associated with a corresponding reference distribution, volume, mass or quantity of material on the sieve.

2. The system according to claim 1 wherein the sieve comprises a lower sieve of the cleaning assembly or an upper sieve of the cleaning assembly.

3. The system according to claim 1 wherein the target crop material comprises grain, oilseed, corn, maize, oats, wheat, rye, barley, soybeans, or fiber.

4. The system according to claim 1 wherein each of the plurality of receivers and the respective microphones are associated with a separate observed phase shift level and a separate observed attenuation level of the received electromagnetic signals to form a profile of observed phase shift levels and observed attenuation levels versus longitudinal displacement along the sieve, and wherein the electronic data processor estimates a profile height and composition of harvested agricultural material on the sieve along its longitudinal axis based on the separate observed phase shift levels and the separate observed attenuation levels.

5. The system according to claim 1 wherein the other observed signal parameters comprise sound pressure level, where sound pressure level refers to a difference between a mean local air pressure and the pressure in the transmitted wave relative to a reference sound pressure level.

6. The system according to claim 1 wherein the other observed signal parameters comprise distortion, as measured by total harmonic distortion or other modification of the transmitted wave from its original waveform because of reflections of the transmitted waves in the second mode, absorption of the transmitted waves in the first mode, or introduction of harmonic components from the shape of components within the cleaning assembly or combine.

7. The system according to claim 1 wherein the at least one transmitter comprises a plurality of transmitters associated with corresponding transducers, wherein each transmitter and respective transducer operate on the same frequency or wavelength for an allotted time window in a time division multiplex scheme.

8. The system according to claim 1 wherein the at least one transmitter comprises a plurality of transmitters associated with corresponding transducers, wherein each transmitter and respective transducer operate simultaneously on different frequencies or wavelength.

9. The system according to claim 1 wherein the first mode comprises positioning the transducers below the sieve and the microphones above the sieve.

10. The system according to claim 1 wherein the second mode comprises positioning the transducers above the sieve and the microphones above the sieve.

11. The system according to claim 1 wherein the target wavelength range further comprises a sonic range of human audible wavelengths and subsonic wavelengths below the sonic range.

12. The system according to claim 1 wherein the first mode the plurality of receivers measure attenuation through the harvested agricultural material at corresponding microphones and wherein in the second mode the plurality of receivers measures a propagation time from transmission at transmission time of the transducers to a reception time of the transmission reflected from the harvested agricultural material at respective microphones associated with the receivers.

13. A method for measurement of harvested agricultural material in a cleaning assembly of a combine or harvester, the method comprising:
    separating the harvested agricultural material into crop residue and target crop material;
    generating or transmitting an electromagnetic signal;
    converting the transmitted electromagnetic signal into transmitted waves within a target wavelength range comprising an ultrasonic wavelength range;
    converting the transmitted waves into a received electromagnetic signal, each of a set of microphones longitudinally spaced apart from each other along a longitudinal axis of the sieve for reception of the transmitted electromagnetic signal in a first mode through the harvested agricultural material, or in a second mode reflected from the harvested agricultural material;
    receiving the received electromagnetic signals associated with respective ones of the microphones, each of the plurality of receivers arranged to detect a corresponding observed phase shift and a corresponding observed attenuation, or the observed attenuation, or other observed signal parameters for its respective microphone;

estimating a distribution or quantity of material on the sieve along the longitudinal axis based on the observed phase shift and the observed attenuation, or the observed attenuation, or the other observed signal parameters relative to a reference phase shift and a reference attenuation, the reference attenuation, or other reference signal parameter associated with a corresponding reference distribution, volume, mass or quantity of material on the sieve.

14. The method according to claim 13 wherein the sieve comprises a lower sieve of the cleaning assembly or an upper sieve of the cleaning assembly.

15. The method according to claim 13 wherein the target crop material comprises grain, oilseed, corn, maize, oats, wheat, rye, barley, soybeans, or fiber.

16. The method according to claim 13 wherein the estimating of the distribution comprises forming a profile of observed phase shift levels and observed attenuation levels versus longitudinal displacement along the sieve, and estimating a profile height and composition of harvested agricultural material on the sieve along its longitudinal axis based on separate observed phase shift levels and separate observed attenuation levels measured from an array of microphones.

17. The method according to claim 13 wherein the other observed signal parameters comprise sound pressure level, where sound pressure level refers to a difference between a mean local air pressure and the pressure in the transmitted wave relative to a reference sound pressure level.

18. The method according to claim 13 wherein the other observed signal parameters comprise distortion, as measured by total harmonic distortion or other modification of the transmitted wave from its original waveform because of reflections of the transmitted waves in the second mode, absorption of the transmitted waves in the first mode, or introduction of harmonic components from the shape of components within the cleaning assembly or combine.

* * * * *